J. N. GOODALL.
PIPE COUPLING.
APPLICATION FILED APR. 7, 1913.
1,139,671.
Patented May 18, 1915.
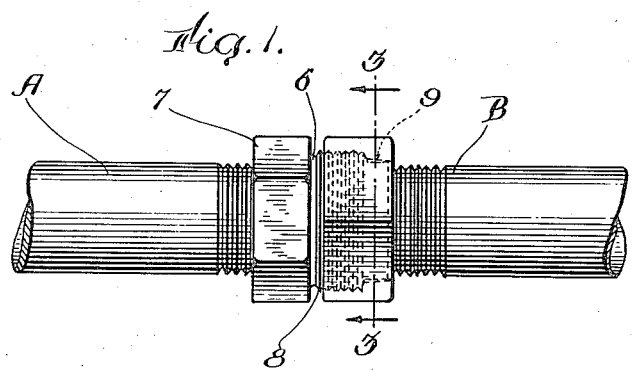
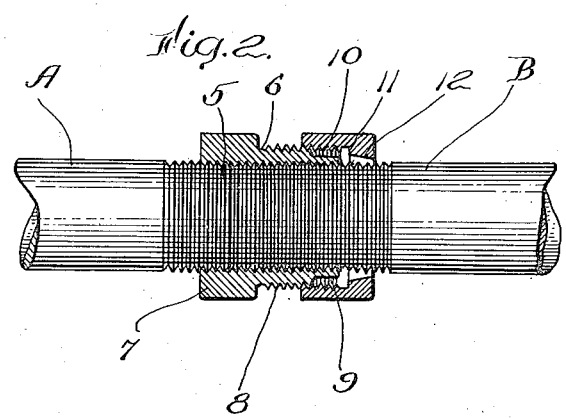
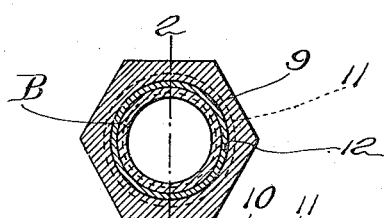
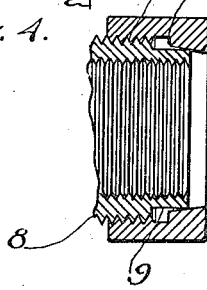
Witnesses:
L. B. Weymouth
E. C. Murphy
Inventor:
John N. Goodall
By Henry J. Miller
atty.

UNITED STATES PATENT OFFICE.

JOHN N. GOODALL, OF MELROSE, MASSACHUSETTS.

PIPE-COUPLING.

1,139,671.  Specification of Letters Patent.  Patented May 18, 1915.

Application filed April 7, 1913. Serial No. 759,350.

*To all whom it may concern:*

Be it known that I, JOHN N. GOODALL, of Melrose, in the county of Middlesex and State of Massachusetts, have invented certain new and useful Improvements in Pipe-Couplings, of which the following is a specification, reference being had to the accompanying drawings, forming part thereof.

This invention has reference to improvements in pipe couplings and relates particularly to an improved compression coupling so called.

One object of this invention is to so construct a compression coupling that the compressible member thereof can be compressed against the pipe which said member embraces without reducing the strength of the coupling as a whole.

Another object of the invention is to so construct a compression coupling that said coupling can be applied to pipes which are in alinement.

Other objects of the invention will appear from the following description.

The invention consists in such novel features of construction and combination of parts as shall hereinafter be more fully described and pointed out in the claim.

Figure 1 represents a view in elevation of the improved pipe coupling in relation to portions of pipes to be coupled thereby. Fig. 2, represents a sectional view of the coupling as taken on line 2—2 Fig. 3, the pipes being shown in elevation. Fig. 3, represents a sectional view taken on line 3—3 Fig. 1. Fig. 4, represents an enlarged sectional view of portions of the coupling taken on said line 2—2, Fig. 3 to show approximately the manner in which the conical bore of the compression member acts to compress the parallel periphery of the end of the coupling member.

Similar numbers of reference designate corresponding parts throughout.

Compression couplings of this nature are intended for use in connecting the ends of two pipes arranged in line and for bridging the space, if any, between said ends. For the purpose of resisting the endwise separation of the pipes it is desirable that such pipes and the embracing coupling member be screw threaded and it is also desirable that the coupling member be held from rotation.

In carrying this invention into practice I construct a coupling sleeve having the screw threaded bore 5 and the main external diameter 6 furnished with the enlargement 7, the raised screw thread 8 and the parallel wall 9 which is preferably of less diameter than the screw thread 8 while the wall of this portion 9 is but slightly thicker than the depth of the internal screw thread of said sleeve.

The drawing and compression member is preferably constructed as a nut of any suitable external shape and size and having the internal screw thread 10, the shoulder 11 and the conical bore or integral collar 12 contracting slightly in its extension from said shoulder 11 to the end of the nut, the maximum diameter of such bore 12 being but slightly greater than the end 9 of the coupling sleeve or member and the screw thread 10 of the compression member being adapted to engage the screw thread 8 of said coupling member.

The use of this improved coupling in its application to couple pipes A and B will be understood by reference to the drawings in which it will be seen that the drawing and compression nut or member is preferably first screwed partially on to the thread 8 of the coupling sleeve or member and that said coupling sleeve or member is then secured on to one of the pipes to be coupled until the outer end of enlargement 7 is flush with the end of said pipe, which in the present instance is the pipe B.

Pipe A is now brought into alinement with pipe B, as shown in Fig. 1 and the coupling sleeve or member is screwed forward until it is engaged with the screw thread of pipe A for the desired distance as shown in Fig. 2. Preferably the enlargement 7 is now engaged and held from rotation while the drawing and compression nut is screwed further on to the screw thread 8 of the coupling member whereby the conical bore 12 of the compression nut is drawn on to the end of the parallel wall 9 of the coupling sleeve or member and effects the compression of said end sufficiently to distort the internal threads of the bore 5 of the said coupling sleeve or member into such engagement with the threads of the pipe (B) that said coupling sleeve or member will be held from rotation on said pipe under the ordinary conditions of use.

The engagement of the threaded bore 5 of the coupling sleeve or member with the threads of the pipes A and B will be sufficient to prevent the endwise separation of said pipes.

Having thus described my invention I claim as new and desire to secure by Letters Patent.

A coupling comprising a coupling sleeve having outer and inner parallel screw threaded surfaces, one end of said sleeve having a reduced diameter constituting a continuous wall having a smooth exterior, and a compression nut having an internal screw thread adapted to engage the external screw thread of said sleeve, and a smooth conical bore extending toward one end of said compression member the least diameter of said bore being less than the diameter of the smooth exterior of said sleeve and bearing on said wall at a point spaced from said external thread.

JOHN N. GOODALL.

Witnesses:
HENRY J. MILLER,
ESTHER C. MURPHY.